United States Patent [19]

Okamura et al.

[11] 4,254,917
[45] Mar. 10, 1981

[54] REEL FOR TAPE CASSETTE

[75] Inventors: Masatoshi Okamura; Haruo Shiba, both of Saku, Japan

[73] Assignee: TDK Electronics Company Limited, Tokyo, Japan

[21] Appl. No.: 60,731

[22] Filed: Jul. 25, 1979

[30] Foreign Application Priority Data

Aug. 2, 1978 [JP] Japan .......................... 53-106525[U]

[51] Int. Cl.³ ............................................ B65H 75/18
[52] U.S. Cl. ................................................ 242/68.5
[58] Field of Search .................... 242/68.8, 68.6, 71.8, 242/199, 200

[56] References Cited

U.S. PATENT DOCUMENTS

| | | | |
|---|---|---|---|
| 2,904,277 | 9/1959 | Underwood | 242/68.5 UX |
| 3,056,563 | 10/1962 | Whitnah | 242/71.8 |
| 3,330,494 | 7/1967 | Rissberger, Jr. | 242/71.8 |
| 3,627,221 | 12/1971 | Nichols et al. | 242/68.6 |
| 4,083,508 | 4/1978 | Pattillo | 242/68.5 |

*Primary Examiner*—Stanley N. Gilreath
*Attorney, Agent, or Firm*—Oblon, Fisher, Spivak, McClelland & Maier

[57] ABSTRACT

A reel for a tape cassette comprises reinforcing ribs connected, in the radial direction, with an inner peripheral surface of a magnetic tape winding core which is coaxially placed to the rotary axis. The magnetic tape winding core is formed by an inner tubular wall which is connected with the reinforcing ribs and an outer cylindrical or tubular wall which is coaxially connected with the inner tubular wall with a gap.

7 Claims, 6 Drawing Figures

U.S. Patent Mar. 10, 1981 Sheet 1 of 2 4,254,917 the present invention.

REEL FOR TAPE CASSETTE

BACKGROUND OF THE INVENTION

The present invention relates to a reel for a magnetic tape cassette.

Heretofore, a feeding reel or a winding reel used for a video tape cassette etc. comprises a cylindrical shaft (2) for connecting with a rotary driving shaft and a magnetic tape winding cylindrical core (3) whose diameter is larger than that of the cylindrical shaft (2) which are respectively mounted in a coaxial state on a disk reel hub (1) and reinforcing ribs (4) which are formed in the radial direction between the shaft (2) and the magnetic tape winding core (3).

The reinforcing ribs (4) are required for increasing a mechanical strength of the tape winding core (3) and improving a molten fluidity of a synthetic resin in the molding of the synthetic resin to form the reel. However, the reinforcing ribs (4) cause certain heat shrinkages just after a demolding in the synthetic resin molding operation to deteriorate disadvantageously the roundness degree of the magnetic tape winding core (3) connected with the reinforcing ribs (4). Such disadvantage is further remarkable depending upon an increase of an inner diameter of the magnetic tape winding core (3).

FIG. 3 shows the result of the measurement of roundness degree of the conventional reel for the video tape cassette shown in FIGS. 1 and 2.

In FIG. 3, heat shrinkages (10 μm for one graduation) of the magnetic tape winding core (3) are plotted in its radial direction.

It is understood from FIG. 3, the radius of the magnetic tape winding core (3) is smaller at the positions mounting the reinforcing ribs (4); and the radius is larger at the positions between the reinforcing ribs (4) whereby the reel is deformed in a flowery form as a whole.

SUMMARY OF THE INVENTION

It is an object of the present invention to provide a reel for a tape cassette which is prepared by preventing a deterioration of roundness degree of a magnetic tape winding core which is caused by heat shrinkages of reinforcing ribs.

The foregoing and other objects of the present invention have been attained by providing a reel for tape cassette comprising reinforcing ribs connected, in the radial direction, with an inner peripheral surface of a magnetic tape winding core which is coaxially placed to the rotary axis wherein the magnetic tape winding core is formed by an inner tubular wall which is connected with the reinforcing ribs and an outer tubular wall which is coaxially connected with the inner tubular wall with a gap.

DETAILED DESCRIPTION OF THE PREFERRED EMBODIMENTS

Figure 1:
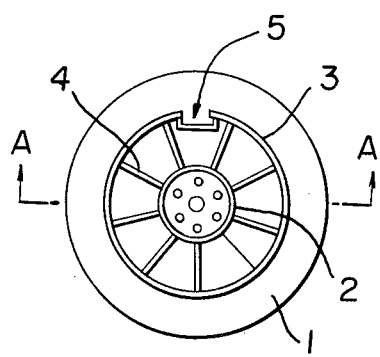
FIG. 1 is a plane view of a reel for the conventional video tape cassette.

Referring to the drawings, one embodiment of the reel for the tape cassette of the present invention will be illustrated.

Figure 4:
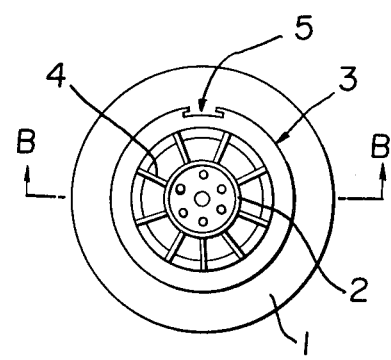
FIG. 4 is a plane view of a reel for a tape cassette of the present invention.
Figure 2:
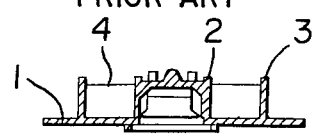
FIG. 2 is a sectional view taken along the A—A line of FIG. 1.
Figure 5:
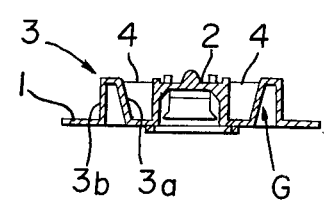
FIG. 5 is a sectional view taken along the B—B line of FIG. 4.
Figure 3:
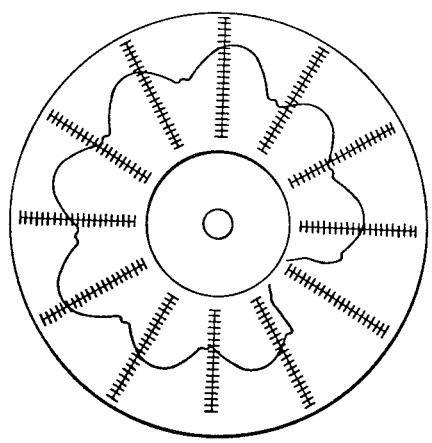
FIG. 3 is a graph of the measurement of round degree of the reel for the tape cassette of FIGS. 1 and 2.

FIG. 4 is a plane view of the reel for the tape cassette of the present invention; and FIG. 5 is a sectional view taken along the B—B line of FIG. 4.

In FIGS. 4 and 5, the feeding reel or the winding reel used for the video tape cassette etc. comprises the cylindrical shaft (2) for connecting with the rotary driving shaft and a magnetic tape winding cylindrical core (3) whose diameter is larger than that of the cylindrical shaft (2), which are respectively mounted, in a coaxial state, the disk reel hub (1) and the reinforcing ribs (4).

In the reel for the tape cassette of the present invention, the magnetic tape winding core (3) is formed by an inner tubular wall (3a) which is connected with the reinforcing ribs (4) in the radial form, and an outer tubular wall or cylindrical body (3b) which is coaxially connected with the inner wall with a gap G. One end of the outer cylindrical body (3b) is connected with one end of the inner wall (3a) and the other end of the outer wall or cylindrical body (3b) is formed on the reel hub (1). The magnetic tape is wound on the outer peripheral surface of the outer cylindrical body (3b). In FIG. 5, the reference numeral (5) designates a notch formed on the peripheral part of the outer cylindrical body (3b). One end of the magnetic tape is held between the notch (5) and a fitting which is fitted in the notch (not shown).

Figure 6:
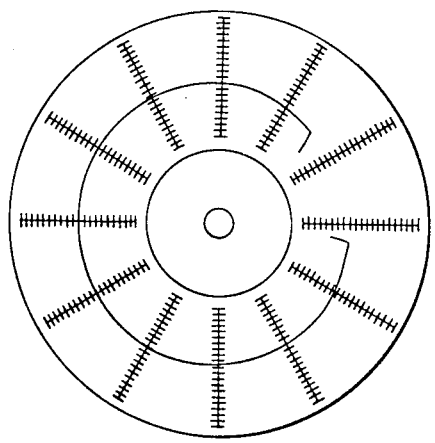
FIG. 6 is a graph of the measurement of roundness degree of the reel for the tape cassette of the present invention.

FIG. 6 shows the result of the measurement of roundness degree of the outer cylindrical body (3b) of the reel for the tape cassette of the present invention. In FIG. 6, heat shrinkages (10 μm for one graduation) of the outer cylindrical body (3b) of the magnetic tape winding core (3) are plotted in its radial direction. As it is clearly understood from FIG. 6, in the reel for the tape cassette of the present invention, the heat shrinkages of the outer cylindrical body (3b) for the magnetic tape winding core (3) are substantially uniform for all peripheral part so as to form substantially the precise circle.

In accordance with the present invention, the magnetic tape winding core (3) is formed by the inner tubular wall (3a) which is connected to the reinforcing ribs (4) in the radial direction and the outer cylindrical body (3b) which is coaxially connected with the inner wall with the gap G. Therefore, the heat shrinkages of the reinforcing ribs are absorbed by the shrinkage of the inner wall (3a) so that the shrinkages do not affect the outer cylindrical body (3b). The outer cylindrical body (3b) is uniformly shrunk so as to maintain the roundness degree. In the structure shown, the inner wall (3a) is in the shape of a frustum of a right circular cone.

As described, in accordance with the present invention, the deterioration of the roundness degree of the magnetic tape winding core caused by the heat shrinking phenomenone of the reinforcing ribs can be completely prevented and the reel for a high quality video tape cassette can be provided.

What is claimed is:

1. A reel for a tape cassette, comprising:

a disk reel hub;

a cylindrical shaft on the hub for connection with a rotary driving shaft; and a cylindrical magnetic tape winding core on the disk reel hub having a diameter larger than the shaft and comprising inner and outer radially spaced apart tubular walls coaxial with the shaft, said walls being joined to one another at one end thereof only, and a plurality of radially extending reinforcing ribs extending between and joined to the shaft and inner wall, said outer wall being free of direct connection to the reinforcing ribs and therefore not subject to deformation during manufacture of the reel.

2. The reel according to claim 1 wherein said outer tubular wall has an outer surface which is precisely perpendicular to said disk reel hub.

3. The reel according to claims 1 or 2, wherein one end of said outer tubular wall is joined to said disk reel hub and one end of said inner tubular wall is joined to said disk reel hub, and the other end of said outer tubular wall and the other end of said inner tubular wall are joined together in one piece.

4. The reel according to claim 1, wherein said inner tubular wall is in the shape of a frustum of a right circular cone and said reinforcing ribs are mounted on the peripheral surface of said inner tubular wall.

5. The reel according to claim 4, wherein said inner tubular wall, said outer tubular wall and said disk reel hub are molded in one piece, the disk reel hub being interrupted between said one ends of the inner and outer tubular walls and the other ends being joined by a narrow annular wall, whereby an annular space is defined between said one ends of the tubular walls and the outer tubular wall is not affected by any uneven shrinkage which may occur as a result of the reinforcing ribs.

6. The reel according to claim 1 wherein a notch is formed on the outer peripheral surface of said outer tubular wall.

7. The reel according to claim 1 wherein said inner tubular wall, said outer tubular wall and said reel hub are molded in one piece.

* * * * *